(12) United States Patent
Ohta et al.

(10) Patent No.: US 12,200,719 B2
(45) Date of Patent: Jan. 14, 2025

(54) COMMUNICATION DEVICE AND COMMUNICATION SYSTEM

(71) Applicant: FUJITSU LIMITED, Kawasaki (JP)

(72) Inventors: Yoshiaki Ohta, Yokohama (JP); Yoshihiro Kawasaki, Kawasaki (JP); Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 17/528,304

(22) Filed: Nov. 17, 2021

(65) Prior Publication Data
US 2022/0078773 A1 Mar. 10, 2022

Related U.S. Application Data

(63) Continuation of application No. PCT/JP2019/022949, filed on Jun. 10, 2019.

(51) Int. Cl.
*H04W 72/23* (2023.01)

(52) U.S. Cl.
CPC .................... *H04W 72/23* (2023.01)

(58) Field of Classification Search
CPC ..... H04W 72/20; H04W 72/21; H04W 72/23; H04W 72/231; H04W 72/232; H04W 72/29; H04W 72/50; H04W 72/56; H04W 72/566
See application file for complete search history.

(56) References Cited

U.S. PATENT DOCUMENTS

2003/0026324 A1* 2/2003 Li .................. H04W 52/50
   375/141
2012/0093052 A1 4/2012 Kang et al.
2013/0203450 A1 8/2013 Mochizuki et al.
(Continued)

FOREIGN PATENT DOCUMENTS

| CN | 103155664 A | 6/2013 |
|---|---|---|
| JP | 2013-545360 A | 12/2013 |
| JP | 2015-536051 A | 12/2015 |

(Continued)

OTHER PUBLICATIONS

3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
(Continued)

*Primary Examiner* — Matthew W Genack
(74) *Attorney, Agent, or Firm* — Myers Wolin, LLC (57) ABSTRACT

A communication device performing wireless communication with a plurality of partner communication devices, the communication device includes a communicator and a controller. The communicator configured to perform communication with a network to which the communication device is connected and a partner communication device included in the plurality of communication devices. The controller configured to cause the plurality of partner communication devices to perform uplink data communication when receiving, from the network, a control signal requesting the uplink data communication with the partner communication devices, which includes information regarding requested uplink data.

6 Claims, 10 Drawing Sheets

(56) References Cited

U.S. PATENT DOCUMENTS

2019/0313319 A1* 10/2019 Qiao .................... H04M 15/57

FOREIGN PATENT DOCUMENTS

| JP | 2016-1900 A | 1/2016 |
|---|---|---|
| WO | 2012/050391 A1 | 4/2012 |
| WO | 2014/041815 A1 | 3/2014 |

OTHER PUBLICATIONS

3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.

3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.

3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.

3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.

3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.

3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.

3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.

3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.

3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.2.0, "3rd Generation Partnership Project; Technical Specification Group Radio Access Network; NR; Services provided by the physical layer (Release 15)", Jun. 2018.

3GPP TS 38.211 V15.2.0, "3rd Generation Partnership Project; Technical Specification Group Radio Access Network; NR; Physical channels and modulation (Release 15)", Jun. 2018.

3GPP TS 38.212 V15.2.0, "3rd Generation Partnership Project; Technical Specification Group Radio Access Network; NR; Multiplexing and channel coding (Release 15)", Jun. 2018.

3GPP TS 38.213 V15.2.0, "3rd Generation Partnership Project; Technical Specification Group Radio Access Network; NR; Physical layer procedures for control (Release 15)", Jun. 2018.

3GPP TS 38.214 V15.2.0, "3rd Generation Partnership Project; Technical Specification Group Radio Access Network; NR; Physical layer procedures for data (Release 15)", Jun. 2018.

3GPP TS 38.215 V15.2.0, "3rd Generation Partnership Project; Technical Specification Group Radio Access Network; NR; Physical layer measurements (Release 15)", Jun. 2018.

3GPP TS 38.300 V15.2.0, "3rd Generation Partnership Project; Technical Specification Group Radio Access Network; NR; NR and NG-RAN Overall Description; Stage 2 (Release 15)", Jun. 2018.

3GPP TS 38.321 V15.2.0, "3rd Generation Partnership Project; Technical Specification Group Radio Access Network; NR; Medium Access Control (MAC) protocol specification (Release 15)", Jun. 2018.

3GPP TS 38.322 V15.2.0, "3rd Generation Partnership Project; Technical Specification Group Radio Access Network; NR; Radio Link Control (RLC) protocol specification (Release 15)", Jun. 2018.

3GPP TS 38.323 V15.2.0, "3rd Generation Partnership Project; Technical Specification Group Radio Access Network; NR; Packet Data Convergence Protocol (PDCP) specification (Release 15)", Jun. 2018.

3GPP TS 38.331 V15.2.1, "3rd Generation Partnership Project; Technical Specification Group Radio Access Network; NR; Radio Resource Control (RRC) protocol specification (Release 15)", Jun. 2018.

3GPP TS 38.401 V15.2.0, "3rd Generation Partnership Project; Technical Specification Group Radio Access Network; NG-RAN; Architecture description (Release 15)", Jun. 2018.

3GPP TS 38.410 V15.0.0, "3rd Generation Partnership Project; Technical Specification Group Radio Access Network; NG-RAN; NG general aspects and principles (Release 15)", Jun. 2018.

3GPP TS 38.413 V15.0.0, "3rd Generation Partnership Project; Technical Specification Group Radio Access Network; NG-RAN; NG Application Protocol (NGAP) (Release 15)", Jun. 2018.

3GPP TS 38.420 V15.0.0, "3rd Generation Partnership Project; Technical Specification Group Radio Access Network; NG-RAN; Xn general aspects and principles (Release 15)", Jun. 2018.

3GPP TS 38.423 V15.0.0, "3rd Generation Partnership Project; Technical Specification Group Radio Access Network; NG-RAN; Xn application protocol (XnAP) (Release 15)", Jun. 2018.

3GPP TS 38.470 V15.2.0, "3rd Generation Partnership Project; Technical Specification Group Radio Access Network; NG-RAN; F1 general aspects and principles (Release 15)", Jun. 2018.

3GPP TS 38.473 V15.2.1, "3rd Generation Partnership Project; Technical Specification Group Radio Access Network; NG-RAN; F1 application protocol (F1AP) (Release 15)", Jul. 2018.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHZ (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

(56) References Cited

OTHER PUBLICATIONS

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
The International Search Report and Written Opinion of the International Searching Authority issued by the Japan Patent Office for corresponding International Patent Application No. PCT/JP2019/022949, mailed on Jul. 30, 2019, with an English translation.
ZTE, "Options comparison for MT EDT", Agenda Item: 12.1.2, 3GPP TSG-RAN2 Meeting #104, R2-1816884, Spokane, USA, Nov. 12-16, 2018.
Notice of Reasons for Refusal issued by the Japan Patent Office for corresponding Japanese Patent Application No. 2021-525419, mailed on Jun. 14, 2022, with a full English machine translation.
First Office Action issued by the China National Intellectual Property Administration for corresponding Chinese Patent Application No. 201980097205.7, mailed on Nov. 14, 2023, with an English translation.
Nokia et al., "(TP for NR BL CR for TS 38.413): Correction of NSSAI for Paging", Agenda Item: 31.3.4.4, 3GPP TSG-RAN WG3 Meeting #101, R3-184428, Gothenburg, Sweden, Aug. 20-24, 2018.
CATT, "(TP for NR BL CR for TS 38.413): Allowed NSSAI in DL NAS Transport", Agenda Item: 31.3.4.4, 3GPP TSG-RAN WG3 Meeting #101, R3-184644, Gothenburg, Sweden, Aug. 20-24, 2018.
Nokia et al., "(TP for NR BL CR for TS 38.413): Correction of NSSAI for Connection Establishment and Paging", Agenda Item: 31.3.1.12, 3GPP TSG-RAN WG3 Meeting #NR AH 1807, R3-183623, Montreal, Canada, Jul. 2-6, 2018.
Ericsson, "Slicing for LTE connected to 5G-CN", Agenda Item: 10.2.4.4, 3GPP TSG-RAN WG2 Meeting #97bis, Tdoc R2-1702558, Spokane, WA, USA, Apr. 3-7, 2017.
Notice of Reasons for Refusal issued by the Japan Patent Office for corresponding Japanese Patent Application No. 2021-525419, mailed on Aug. 23, 2022, with a full English machine translation.

* cited by examiner

COMMUNICATION DEVICE AND COMMUNICATION SYSTEM

CROSS-REFERENCE TO RELATED APPLICATION

This application is a continuation application of International Application PCT/JP2019/022949 filed on Jun. 10, 2019 and designated the U.S., the entire contents of which are incorporated herein by reference.

FIELD

The present invention relates to a communication device and a communication system.

BACKGROUND

In a current network (hereinafter, simply referred to as NW), the traffic of mobile terminals (smartphones and feature phones) account for a majority resources. In addition, the traffic used by the mobile terminals tends to expand.

Meanwhile, with development of Internet of things (IoT) services (for example, transportation systems, smart meters, monitoring systems for devices or the like), it has been demanded to cope with services including various requirement. Consequently, in the communication standard for the fifth generation mobile communication (5G or new radio (NR)) mobile communication, it has been demanded that, in addition to the fourth generation mobile communication (4G) standard techniques, a techniques, which achieve a higher data rate, a larger capacity, and lower latency. Note that, for the fifth generation mobile communication standards, 3GPP working groups (for example, TSG-RAN WG1, TSG-RAN WG2, and the like) have been making a progress on the technical study. Additionally, the first edition of standard specification was released in end of 2017.

For example, in 5G NR downlink data communication, when a base station receives a Paging Request from a NW, the base station transmits the Paging Request to a mobile station. When a mobile station receives the Paging Request from the base station, the mobile station transmits a non access stratum (NAS) Service Request to the base station. Then, the base station transmits the NAS Service Request to the NW. Thereafter, the mobile station performs a NAS procedure with the NW via the base station to establish a downlink. Then, the NW transmits downlink data to the mobile station via the base station. The NW can achieve downlink data communication with the mobile station activated by the NW.

Furthermore, in 5G NR uplink data communication, when the base station receives a NAS Service Request from the mobile station, the base station transmits the NAS Service Request to the NW. When NW receives the NAS Service Request, the NW performs the NAS Procedure with the mobile station via the base station to establish an uplink. Then, the mobile station transmits uplink data to the NW via the base station. The mobile station can achieve uplink data communication with the NW activated by the mobile station.

For example, when the NW transmits a control signal such as downlink (DL) NAS TRANSPORT for the mobile station to each mobile station via the base station, the NW is supposed to transmit the control signal such as DL NAS TRANSPORT individually prepared for each mobile station, to the mobile stations. Then, when each mobile station receives the individually prepared DL NAS TRANSPORT, each mobile station is supposed to transmit a response to the DL NAS TRANSPORT to the NW via the base station.

Related techniques are disclosed in for example Japanese Laid-open Patent Publication No. 2016-001900, Japanese National Publication of International Patent Application No. 2015-536051, 3GPP TS 36.211 V15.2.0 (2018-06), 3GPP TS 36.212 V15.2.1 (2018-07), 3GPP TS 36.213 V15.2.0 (2018-06), 3GPP TS 36.300 V15.2.0 (2018-06), 3GPP TS 36.321 V15.2.0 (2018-07), 3GPP TS 36.322 V15.1.0 (2018-07), 3GPP TS 36.323 V15.0.0 (2018-07), 3GPP TS 36.331 V15.2.2 (2018-06), 3GPP TS 36.413 V15.2.0 (2018-06), 3GPP TS 36.423 V15.2.0 (2018-06), 3GPP TS 36.425 V15.0.0 (2018-06), 3GPP TS 37.340 V15.2.0 (2018-06), 3GPP TS 38.201 V15.0.0 (2017-12), 3GPP TS 38.202 V15.2.0 (2018-06), 3GPP TS 38.211 V15.2.0 (2018-06), 3GPP TS 38.212 V15.2.0 (2018-06), 3GPP TS 38.213 V15.2.0 (2018-06), 3GPP TS 38.214 V15.2.0 (2018-06), 3GPP TS 38.215 V15.2.0 (2018-06), 3GPP TS 38.300 V15.2.0 (2018-06), 3GPP TS 38.321 V15.2.0 (2018-06), 3GPP TS 38.322 V15.2.0 (2018-06), 3GPP TS 38.323 V15.2.0 (2018-06), 3GPP TS 38.331 V15.2.1 (2018-06), 3GPP TS 38.401 V15.2.0 (2018-06), 3GPP TS 38.410 V15.0.0 (2018-06), 3GPP TS 38.413 V15.0.0 (2018-06), 3GPP TS 38.420 V15.0.0 (2018-06), 3GPP TS 38.423 V15.0.0 (2018-06), 3GPP TS 38.470 V15.2.0 (2018-06), 3GPP TS 38.473 V15.2.1 (2018-07), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), and 3GPP TR 38.913 V15.0.0 (2018-06).

SUMMARY

According to an aspect of the embodiments, a communication device performing wireless communication with a plurality of partner communication devices, the communication device includes a communicator configured to perform communication with a network to which the communication device is connected and a partner communication device included in the plurality of communication devices; and a controller configured to cause the plurality of partner communication devices to perform uplink data communication when receiving, from the network, a control signal requesting the uplink data communication with the partner communication devices, which includes information regarding requested uplink data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in the NW, when the control signal such as the DL NAS TRANSPORT individually prepared for each mobile station is transmitted to the mobile stations via the base station, the overhead of the control signal for simultaneous call, simultaneous control, or the like to a plurality of mobile stations will increase because the control signal is individually prepared for each mobile station.

In one aspect, it is an object to provide a communication device and the like capable of reducing the overhead of a control signal.

Hereinafter, the present embodiments will be described in detail with reference to the drawings. Problems and examples in the present description are merely examples and do not limit the scope of rights of the present application. For example, as long as the described expressions are technically equivalent even if different described expressions are used, the techniques of the present application may be applied to the different described expressions, and the scope of rights is not limited thereby. In addition, each of the embodiments may be suitably combined within a range that does not cause contradiction between processing contents.

Furthermore, it is also permissible if, as the used terms and the described technical contents in the present description, terms and technical contents described in specifications and contributions as standards related to communication, such as 3GPP, are appropriately used. For example, such specifications include 3GPP TS 38.211 V15.1.0 (2018-03) mentioned above.

Hereinafter, examples of a communication device and a communication system disclosed in the present application will be described in detail with reference to the drawings. Note that the following examples do not limit the disclosed technique.

First Example

Figure 1:
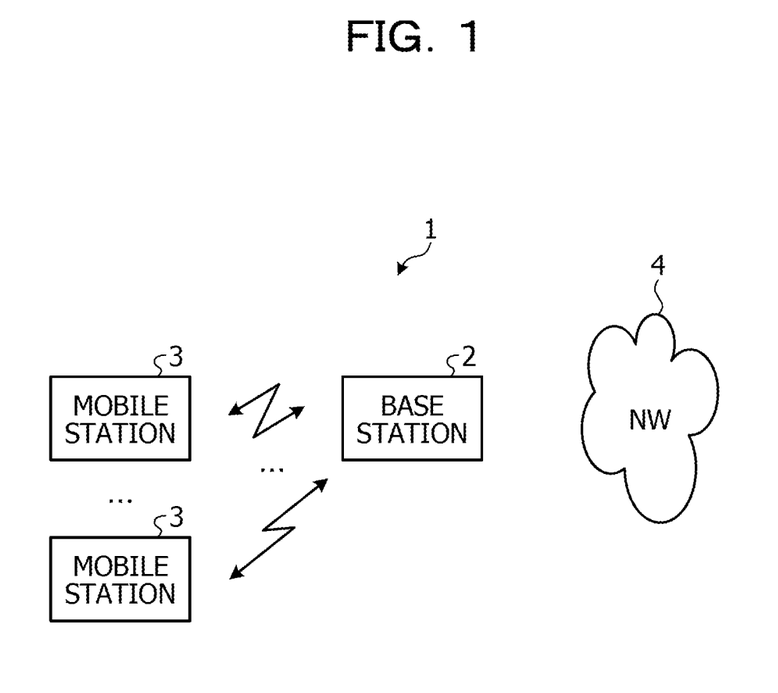
FIG. 1 is an explanatory diagram illustrating an example of a wireless system of a first example.

FIG. 1 is an explanatory diagram illustrating an example of a wireless system 1 of a first example. The wireless system 1 illustrated in FIG. 1 includes a base station 2, a plurality of mobile stations 3 that wirelessly communicate with the base station 2, and a core network (hereinafter, simply referred to as NW) 4. The wireless system 1 is, for example, a 5G wireless system. The mobile station 3 is, for example, a portable terminal such as a smartphone or a tablet.

Figure 2:
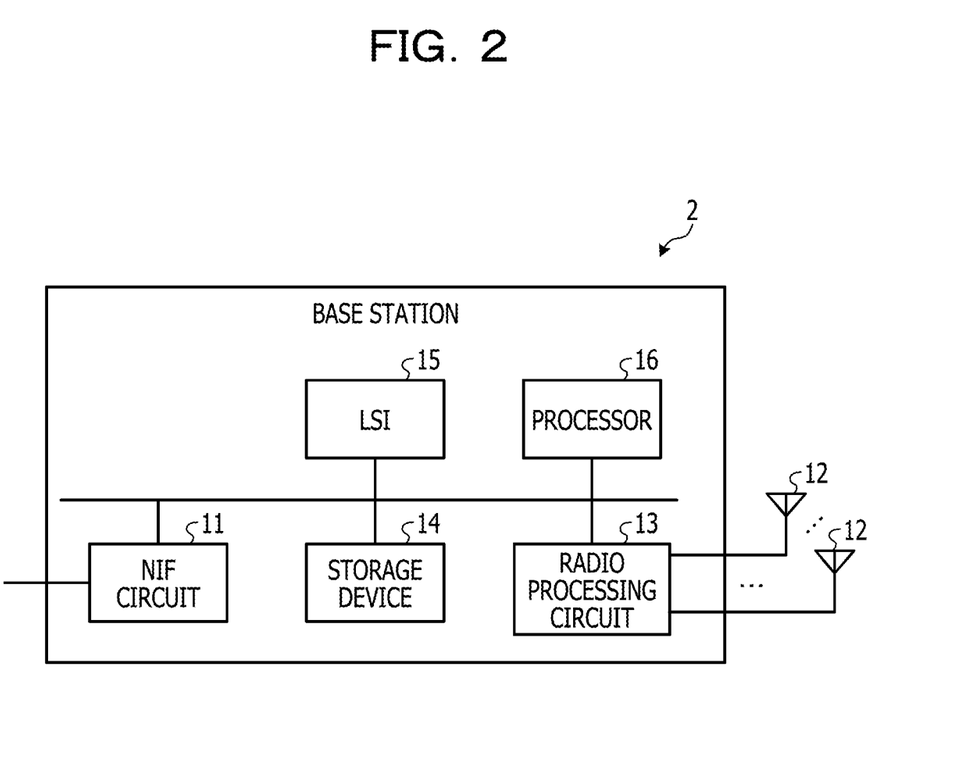
FIG. 2 is a block diagram illustrating an example of a hardware structure of a base station.

FIG. 2 is a block diagram illustrating an example of a hardware structure of the base station 2. The base station 2 illustrated in FIG. 2 includes a network interface (NIF) circuit 11, a plurality of antenna elements 12, a radio processing circuit 13, a storage device 14, large scale integration (LSI) 15, and a processor 16. The NIF circuit 11 is an interface (IF) circuit that is in charge of wired communication with the NW 4 connected to another base station 2. The radio processing circuit 13 is an IF circuit that is in charge of wireless communication with the mobile station 3 through the antenna element 12. The storage device 14 is a device that stores various types of information. The LSI 15 is a circuit that performs various controls. The processor 16 controls the entire base station 2.

Figure 3:
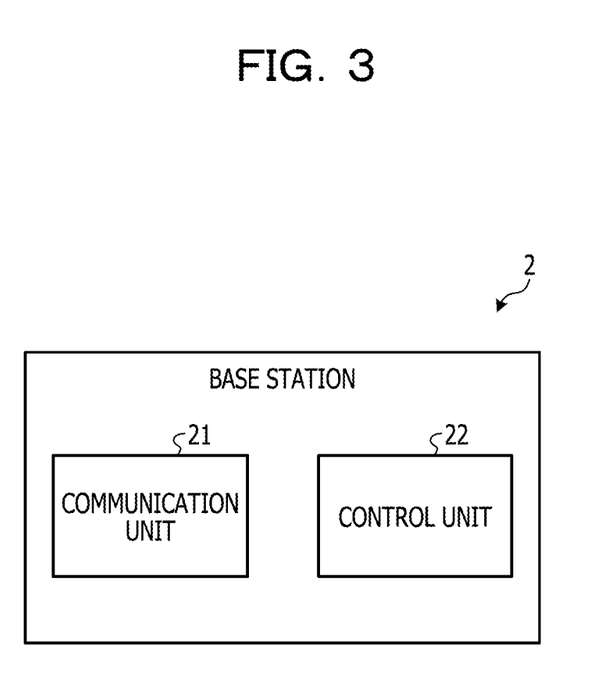
FIG. 3 is a block diagram illustrating an example of a functional structure of the base station.

FIG. 3 is a block diagram illustrating an example of a functional structure of the base station 2. The base station 2 includes a communication unit 21 and a control unit 22 as functions. The communication unit 21 performs communication with the NW 4 to which the base station 2 is connected and the mobile station 3. When receiving, from the NW 4, a control signal requesting uplink data communication with the mobile stations 3, which includes information regarding requested uplink data, the control unit 22 causes the plurality of mobile stations 3 to perform the uplink data communication. For example, the control unit 22 transmits the control signal simultaneously to each mobile station 3. The control unit 22 controls the wireless communication for the uplink data communication in response to the request. When receiving Paging or DL NAS TRANSPORT as a control signal, the control unit 22 causes a plurality of mobile stations 3 to perform the uplink data communication. This means that, for example, the control unit 22 transmits the control signal such as the Paging or DL NAS TRANSPORT simultaneously to each mobile station 3. Note that, the Paging or DL NAS TRANSPORT is originally a signal utilized as a control signal for requesting a downlink signal. However, by making use of the properties of these signals (for example, the fact that the signals are directed to a plurality of mobile stations 3), the Paging or DL NAS TRANSPORT is used to cause a plurality of mobile stations 3 to perform the uplink data communication.

Figure 4:
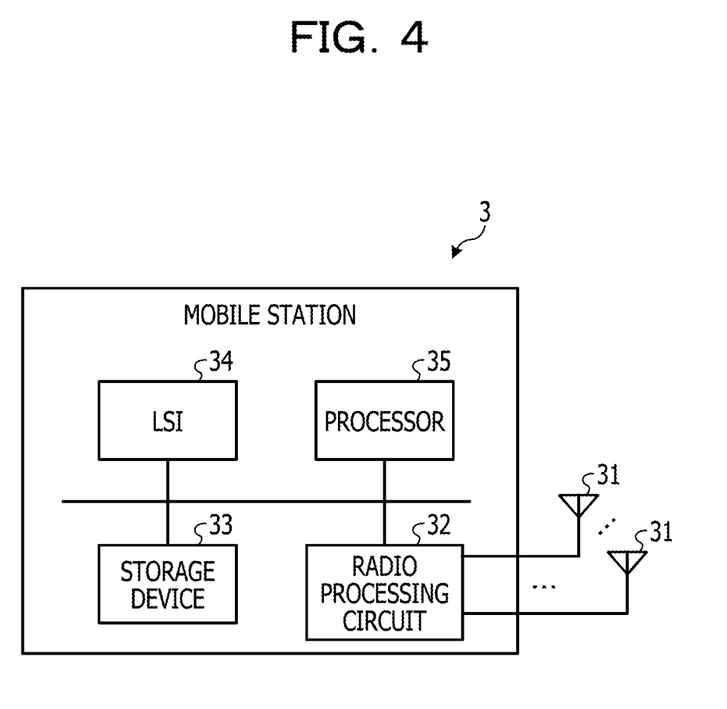
FIG. 4 is a block diagram illustrating an example of a hardware structure of a mobile station.

FIG. 4 is a block diagram illustrating an example of a hardware structure of the mobile station 3. The mobile station 3 illustrated in FIG. 4 includes antenna elements 31, a radio processing circuit 32, a storage device 33, LSI 34, and a processor 35. The radio processing circuit 32 is an IF circuit that is in charge of wireless communication with the base station 2 through the antenna element 31. The LSI 34 is a circuit that performs various controls. The storage device 33 is a device that stores various types of information. The processor 35 controls the entire mobile station 3.

Figure 5:
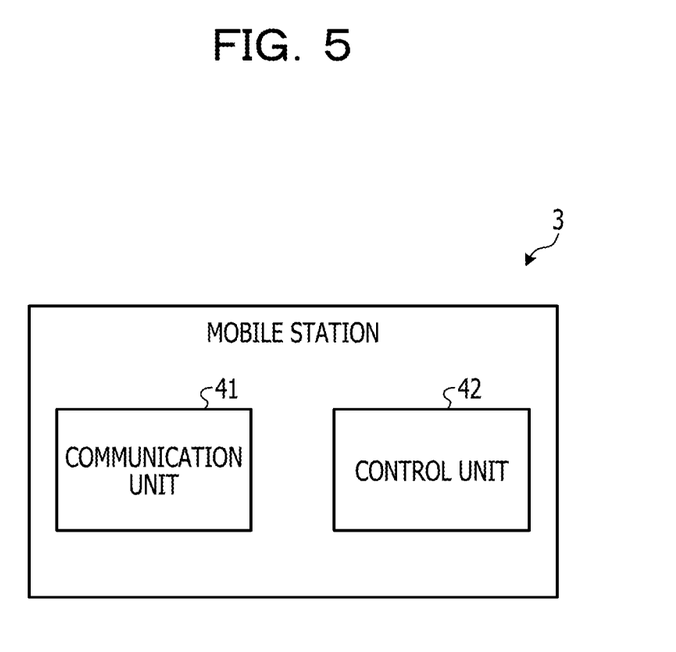
FIG. 5 is a block diagram illustrating an example of a functional structure of the mobile station.

FIG. 5 is a block diagram illustrating an example of a functional structure of the mobile station 3. The mobile station 3 includes a communication unit 41 and a control unit 42 as functions. The communication unit 41 performs wireless communication with the base station 2 connected to the NW 4. When receiving, from the base station 2, a control signal requesting uplink data communication, which includes information regarding requested uplink data, the control unit 42 performs the uplink data communication with the base station 2.

Figure 6:
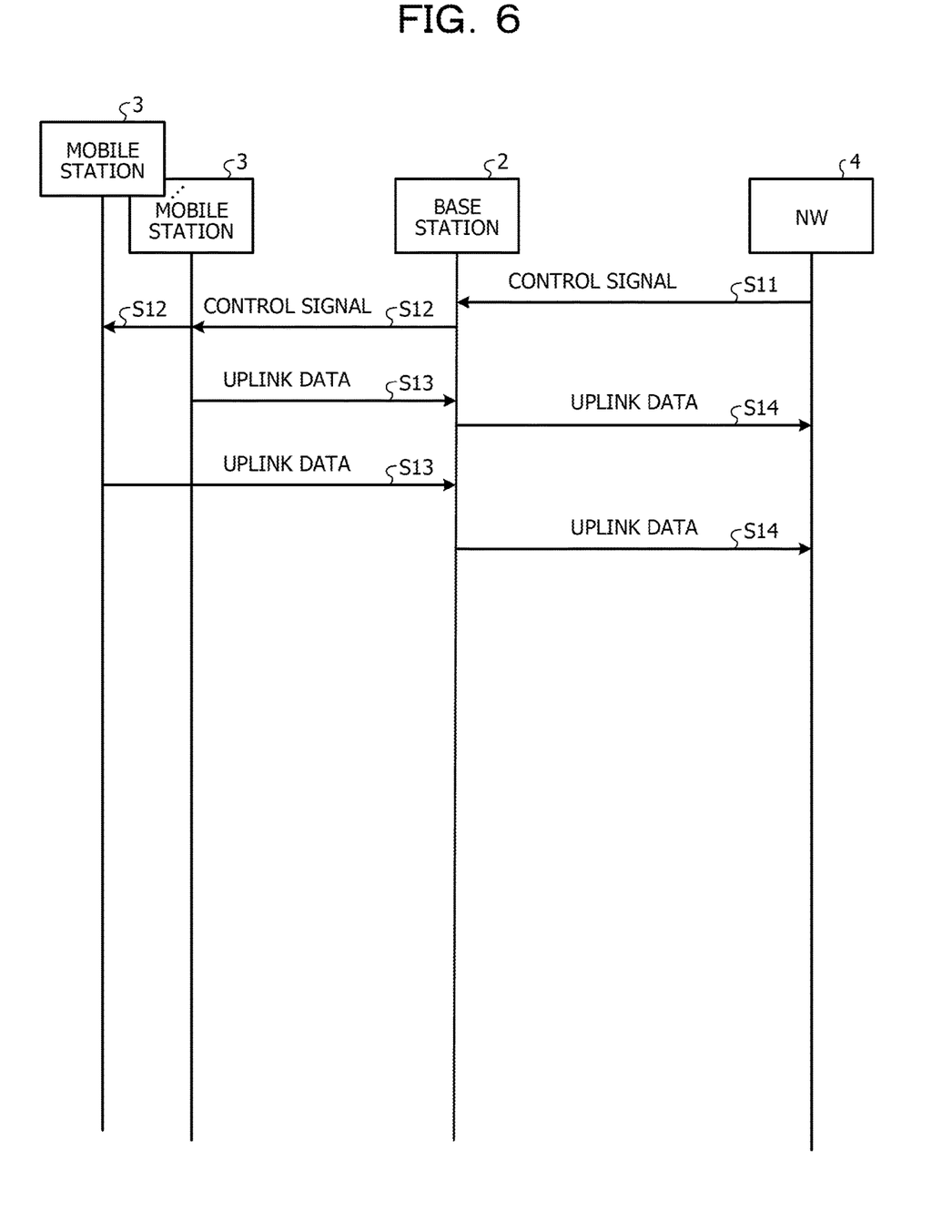
FIG. 6 is a sequence diagram illustrating an example of an uplink data communication operation of the wireless system of the first example.

FIG. 6 is a sequence diagram illustrating an example of an uplink data communication operation of the wireless system 1 of the first example. The NW 4 transmits a control signal to cause a plurality of mobile stations 3 to perform uplink data communication, to the base station 2 (step S11). The base station 2 transmits the control signal simultaneously to each mobile station 3 included in the wireless system 1 (step S12).

When each mobile station 3 receive the control signal, each mobile station 3 transmits uplink data to the base station 2 (step S13). Furthermore, the base station 2 transmits the uplink data from each mobile station 3 to the NW 4 (step S14) and ends the processing operation illustrated in FIG. 6.

For example, the NW 4 transmits the control signal simultaneously to each mobile station 3 included in the wireless system 1 via the base station 2. Then, when each mobile station 3 receives the control signal, each mobile station 3 performs the uplink data communication. Therefore, the overhead of the control signal may be reduced by transmitting the control signal simultaneously to each mobile station 3 included in the wireless system 1.

For the wireless system 1 of the first example, a case where the control signal to cause the mobile stations 3 to perform the uplink data communication is transmitted from the NW 4 has been exemplified. In contrast to this, for example, an embodiment when the control signal of New Paging Request is transmitted will be described below as a second example. Note that, by giving the same reference signs to the same components as those of the wireless system 1 of the first example, redundant description of configurations and operations for the same components will be omitted.

Second Example

Figure 7:
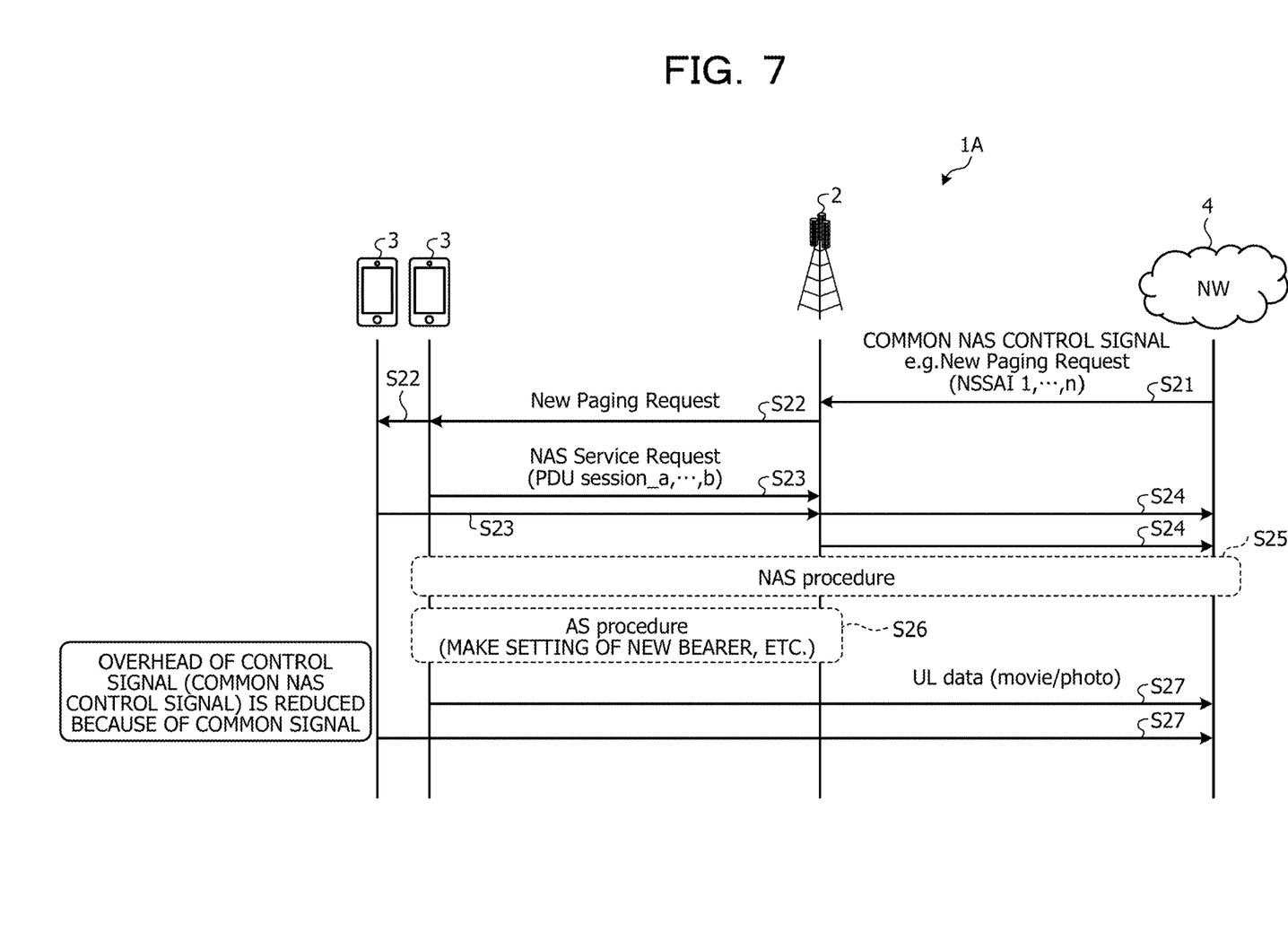
FIG. 7 is a sequence diagram illustrating an example of an uplink data communication operation of a wireless system of a second example.

FIG. 7 is a sequence diagram illustrating an example of an uplink data communication operation of a wireless system 1A of the second example. Note that, for convenience of explanation, a NW 4 included in the wireless system 1A is assumed to be set with, for example, a network slice for video distribution in advance. The NW 4 illustrated in FIG. 7 transmits, for example, a common NAS control signal such as a New Paging Request to a base station 2 (step S21). Note that, the common NAS control signal includes, for example, network slice selection assistance information (NSSAI) as a slice identifier (ID) that identifies a network slice configured to provide video. When the base station 2 receives the common NAS control signal, the base station 2 transmits the New Paging Request simultaneously to each mobile station 3 included in the wireless system 1A (step S22). Note that, the New Paging Request is, for example, a common NAS control signal that includes the NSSAI as a slice ID.

When the mobile station 3 receives the New Paging Request from the base station 2, the mobile station 3 determines whether or not a condition corresponding to the slice ID included in the received New Paging Request has been accepted. When the condition corresponding to the slice ID has been accepted, the mobile station 3 transmits a NAS Service Request including a protocol data unit (PDU) Session permitted on the side of the mobile station 3 to the base station 2 (step S23).

When the base station 2 receives the NAS Service Request including the PDU Session, the base station 2 transmits the NAS Service Request to the NW 4 (step S24). When the NW 4 receives the NAS Service Request, the NW 4 performs a NAS Procedure for establishing communication with the mobile station 3 via the base station 2 (step S25).

After performing the NAS Procedure, the base station 2 performs an access stratum (AS) Procedure with the mobile station 3 (step S26). Then, after performing the AS Procedure, each mobile station 3 transmits uplink data to the NW 4 via the base station 2 (step S27) and ends the processing operation illustrated in FIG. 7. Note that, the AS Procedure includes, for example, processing from setting the number of mobile stations 3 that transmit uplink data and an appropriate amount of resources on the frequency axis and time axis according to the radio quality of the mobile station 3 until selecting a resource according to the measurement result of path loss on the side of the mobile station 3, and processing of setting a new bearer. Therefore, the tightness of wireless resources due to the transmission of a huge amount of uplink data may be avoided.

In addition, each mobile station 3 is assumed not to perform uplink data transmission to the base station 2 when the condition corresponding to the slice ID in the received New Paging Request has not been accepted, which is a case where the condition corresponding to the slice ID has been rejected.

The NW 4 of the second example transmits the common NAS control signal including the NSSAI simultaneously to each mobile station 3 included in the wireless system 1A via the base station 2. When each mobile station 3 receives the common NAS control signal, each mobile station 3 performs the uplink data communication in a case where the condition corresponding to the slice ID in the NSSAI included in the common NAS control signal has been accepted. Therefore, the overhead of the common NAS control signal may be reduced by transmitting the common NAS control signal simultaneously to all of the mobile stations 3 included in the wireless system 1A.

As a method of transmitting the New Paging Request illustrated in FIG. 7, the cyclic redundancy check (CRC) within the physical downlink control channel (PDCCH) associating with the New Paging Request may be masked with the paging-radio network temporary identifier (P-RNTI).

Figure 8:
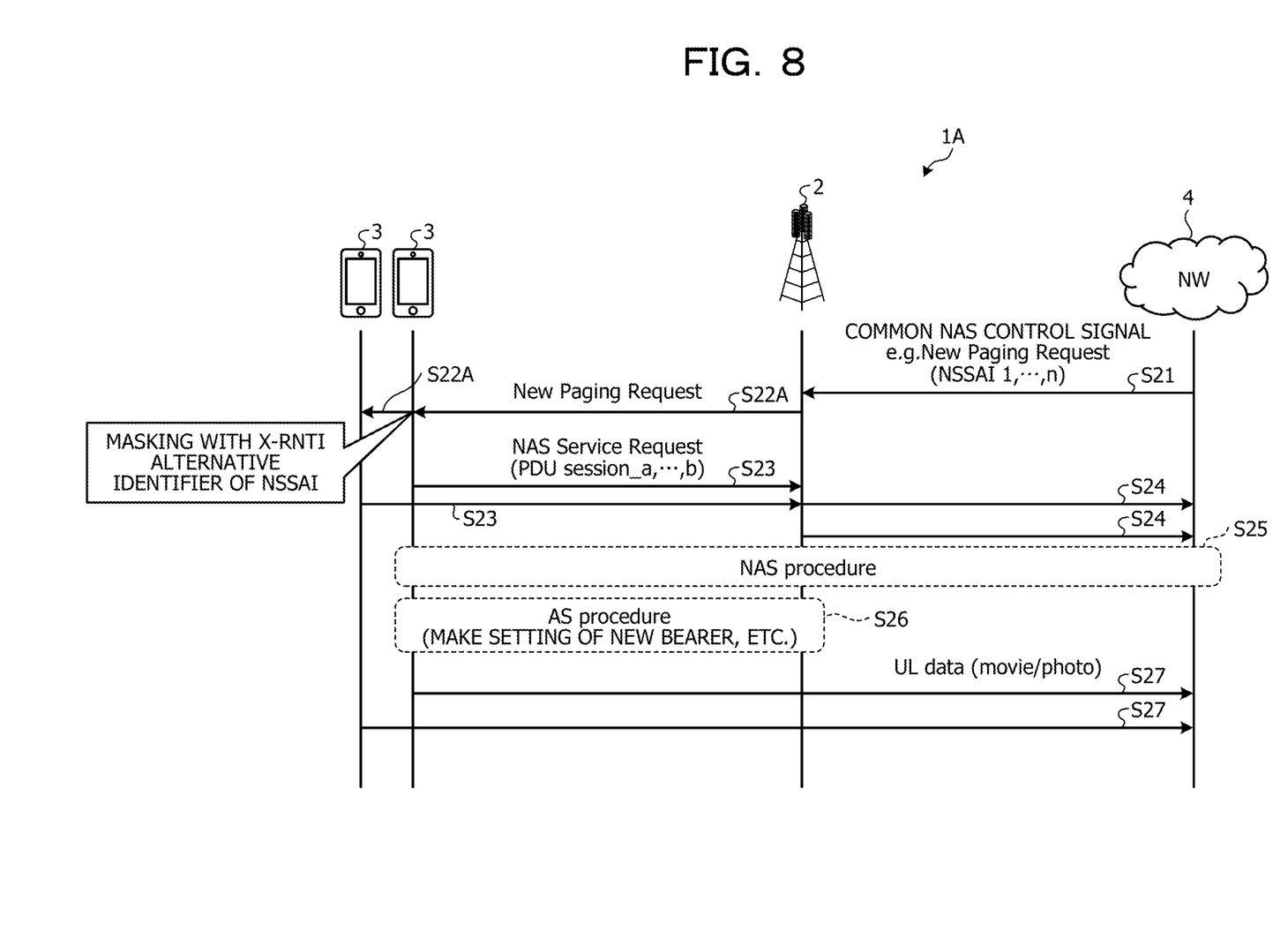
FIG. 8 is a sequence diagram illustrating an example of an uplink data communication operation as a modification of the second example.

The method of transmitting the New Paging Request illustrated in FIG. 7 has been exemplified in the case of masking the CRC within the PDCCH associating with the New Paging Request with P-RNTI, but the method is not limited to this case and may be as illustrated in FIG. 8.

FIG. 8 is a sequence diagram illustrating an example of an uplink data communication operation as a modification of the second example. When the base station 2 receives a common NAS control signal such as the New Paging Request (step S21), the base station 2 transmits the New Paging Request including the NSSAI to each mobile station 3 included in the wireless system 1A (step S22A). The base station 2 may transmit the New Paging Request by masking the CRC within the PDCCH with another RNTI such as X-RNTI, instead of the P-RNTI, for example. Therefore, since the mobile station 3 that does not know the X-RNTI is not allowed to recognize the X-RNTI, the reception of the New Paging Request including the NSSAI from the base station 2 may be avoided.

Further, the base station 2 may transmit the New Paging Request by defining a plurality of corresponding X-RNTIs, instead of transmitting the NSSAI. In this case, the NSSAI does not need to be defined in the New Paging Request.

Note that, a case where the common NAS control signal is transmitted to the base station 2 while the connection state between the mobile station 3 and the base station 2 included in the wireless system 1A of the second example is in the idle mode of the radio resource control (RRC) has been exemplified. Note that, the first example and the second example may be used in combination. For example, the New Paging Request described in the second example may be adopted as the control signal explained in the first example. Furthermore, an embodiment in a case where the common NAS control signal is transmitted to the base station 2 in the connected mode of the RRC, instead of the idle mode of the RRC, will be described below as a third example. Note that, by giving the same reference signs to the same components as those of the wireless system 1 of the first example, redundant description of configurations and operations for the same components will be omitted.

Third Example

Figure 9:
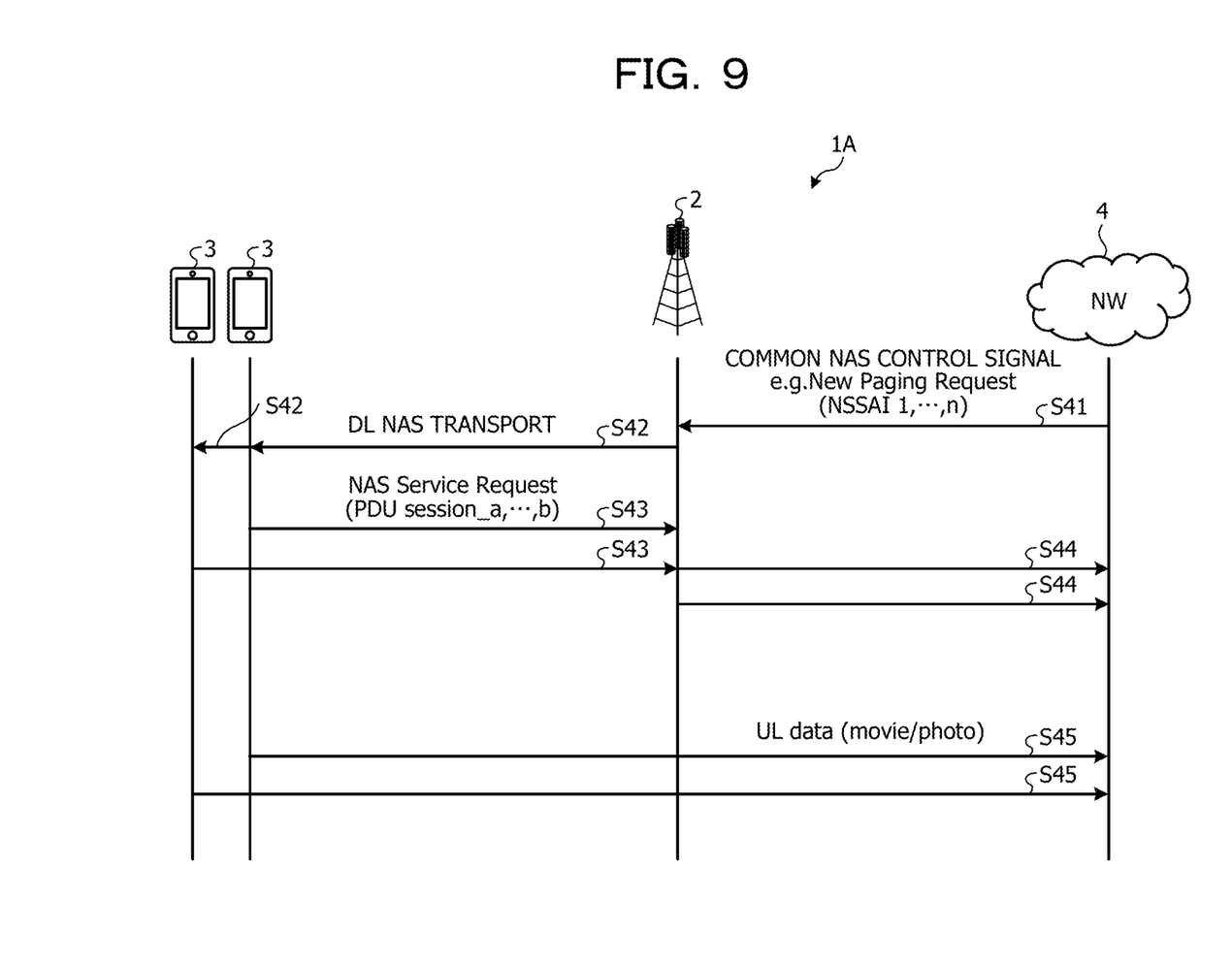
FIG. 9 is a sequence diagram illustrating an example of an uplink data communication operation of a wireless system of a third example.

FIG. 9 is a sequence diagram illustrating an example of an uplink data communication operation of a wireless system 1A of the third example. A NW 4 transmits a common NAS control signal such as the DL NAS TRANSPORT to a base station 2 during the connected mode (step S41). Note that, the common NAS control signal includes the NSSAI. When the base station 2 receives the common NAS control signal such as the DL NAS TRANSPORT, the base station 2 transmits the DL NAS TRANSPORT simultaneously to each mobile station 3 included in the wireless system 1A (step S42). When each mobile station 3 receives the DL NAS TRANSPORT, each mobile station 3 determines whether or not a condition corresponding to the slice ID within the NSSAI included in the DL NAS TRANSPORT has been accepted. When the condition corresponding to the slice ID within the NSSAI included in the DL NAS TRANSPORT has been accepted, the mobile station 3 transmits a NAS Service Request including a permitted PDU Session to the base station 2 (step S43). The base station 2 transmits the NAS Service Request including the PDU Session to the NW 4 (step S44). The mobile station 3 transmits uplink data to the NW 4 via the base station 2 using the PDU Session (step S45) and ends the processing operation illustrated in FIG. 9.

In addition, each mobile station 3 is assumed not to perform uplink data transmission to the base station 2 when the condition corresponding to the slice ID in the DL NAS TRANSPORT received from the base station 2 has not been accepted, which is a case where the condition corresponding to the slice ID has been rejected.

The NW 4 of the third example transmits the common NAS control signal including the NSSAI simultaneously to each mobile station 3 included in the wireless system 1A via the base station 2 during the connected mode of the RRC. When each mobile station 3 receives the common NAS control signal, each mobile station 3 performs the uplink data communication in a case where the condition corresponding to the slice ID in the NSSAI included in the common NAS control signal has been accepted. Therefore, the overhead of the common NAS control signal may be reduced by transmitting the common NAS control signal simultaneously to control all of the mobile stations 3 included in the wireless system 1A even during the connected mode of the RRC.

Figure 10:
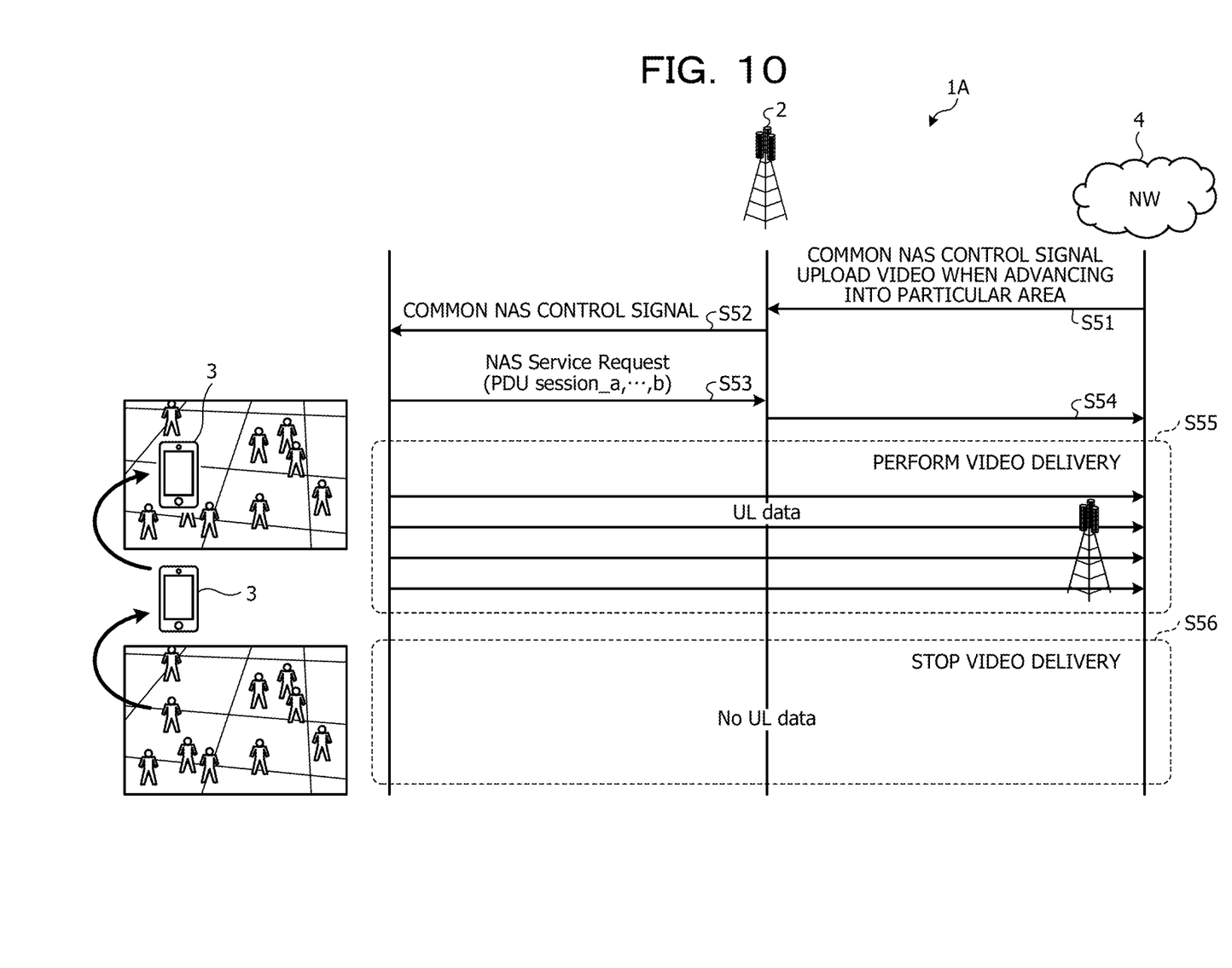
FIG. 10 is a sequence diagram illustrating an example of an uplink data communication operation as a specific example of the third example.

FIG. 10 is a sequence diagram illustrating an example of an uplink data communication operation as a specific example of the third example. The common NAS control signal illustrated in FIG. 10 is assumed as, for example, a control signal as DL NAS TRANSPORT to transmit a video to the NW 4 when the mobile station 3 enters a particular area. The uplink data is, for example, assumed as video data uploaded to the NW 4 when the mobile station 3 advances into the particular area.

In FIG. 10, the NW 4 transmits a common NAS control signal to the base station 2 (step S51). When the base station 2 receives the common NAS control signal, the base station 2 transmits the common NAS control signal to each mobile station 3 included in the wireless system 1A (step S52).

Each mobile station 3 transmits a NAS Service Request including a PDU Session to the base station 2 when a condition corresponding to the slice ID in the NSSAI contained in the common NAS control signal is accepted, for example, when the mobile station 3 advances into the particular area (step S53). The base station 2 transmits the NAS Service Request including the PDU Session to the NW 4 (step S54). The mobile station 3 transmits the video data to the NW 4 via the base station 2 in the PDU Session (step S55).

Further, the mobile station 3 stops transmitting the video data to the NW 4 when the condition corresponding to the slice ID in the NSSAI included in the common NAS control signal is not accepted, which is a case where the condition is rejected, for example, when the mobile station 3 leaves the particular area (step S56) and ends the processing operation illustrated in FIG. 10.

The NW 4 transmits the common NAS control signal including the NSSAI simultaneously to each mobile station 3 included in the wireless system 1A via the base station 2 during the connected mode of the RRC. When each mobile station 3 receives the common NAS control signal, each mobile station 3 performs the uplink data communication, which is the video data communication, to the NW 4 when the condition corresponding to the slice ID in the NSSAI included in the common NAS control signal is accepted, for example, when the mobile station 3 advances into the particular area. Therefore, the overhead of the common NAS control signal may be reduced by transmitting the common NAS control signal simultaneously to control all the mobile stations 3 included in the wireless system 1A even during the connected mode of the RRC.

Note that, for convenience of explanation, the New Paging Request, DL NAS TRANSPORT, and the like have been exemplified as the common NAS control signals, but the common NAS control signal is not limited to these and may be changed as appropriate. Furthermore, the base station 2 may be a relay station that relays communication between the base stations 2 and may be changed as appropriate. Note that, the first example and the second example may be used in combination as appropriate unless otherwise contradicted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device performing wireless communication with a plurality of partner communication devices, the communication device comprising:
   a communicator configured to perform communication with a network to which the communication device is connected and a partner communication device included in the plurality of partner communication devices; and
   controller circuitry configured to:
   when the communicator receives, from the network, a control signal that requests uplink data communication with the plurality of partner communication devices, and that includes identifier information identifying a network slice regarding requested uplink data, cause a first partner communication device among the plurality of partner communication devices to perform uplink data communication, the network slice indicated by the identifier information being accepted for the first partner communication device, wherein the communication device simultaneously transmits the control signal to the plurality of partner communication devices.

2. The communication device according to claim 1, wherein
the controller circuitry is further configured to control the wireless communication for the uplink data communication in response to the request.

3. The communication device according to claim 1, wherein
when Paging or downlink (DL) non access stratum (NAS) TRANSPORT as the control signal is received, the controller circuitry is further configured to causes the plurality of partner communication devices to perform the uplink data communication.

4. The communication device according to claim 1, wherein
the controller circuitry is further configured to, when the communicator receives, from the network, the control signal,
transmit the control signal to the plurality of partner communication devices, the transmitted control signal being associated with a physical downlink control channel (PDCCH) within which a cyclic redundancy check (CRC) is masked with an identifier.

5. A communication device configured to perform wireless communication with a partner communication device, the communication device comprising:
a communicator configured to perform the wireless communication with the partner communication device, the partner communication device connected to a network, and the partner communication device is connected to one or more other communication devices; and
controller circuitry configured to:
when the communicator receives substantially simultaneously with the one or more other communication devices, from the partner communication device, a control signal that requests uplink data communication, and that includes identifier information identifying a network slice regarding requested uplink data, whereby the partner communication device received the control signal that includes the identifier information from the network,
perform uplink data communication with the partner communication device, for which the network slice indicated by the identifier information is accepted.

6. A communication system comprising:
a plurality of partner communication devices; and
a communication device configured to perform wireless communication with the plurality of partner communication devices, wherein
the communication device includes:
a communicator configured to perform communication with a network to which the communication device is connected and the plurality of partner communication devices; and
controller circuitry configured to:
when the communicator receives, from the network, a control signal that requests uplink data communication with the plurality of partner communication devices, and that includes identifier information identifying a network slice regarding requested uplink data,
cause a first partner communication device among the plurality of partner communication devices to perform uplink data communication, the network slice indicated by the identifier information being accepted for the first partner communication device, wherein the communication device simultaneously transmits the control signal to the plurality of partner communication devices.

* * * * *